United States Patent [19]

Plesinger

[11] Patent Number: 5,146,354
[45] Date of Patent: Sep. 8, 1992

[54] LCD SYSTEM WITH A BACKLIGHT HAVING A LIGHT SOURCE AT A LIGHT PIPE'S EDGE AND WITH THE LCD ENFRAMED

[75] Inventor: Boris Plesinger, Tomball, Tex.

[73] Assignee: Compaq Computer Corporation, Houston, Tex.

[21] Appl. No.: 696,779

[22] Filed: May 7, 1991

[51] Int. Cl.$^5$ ................ G02F 1/1335; G02F 1/1333; F21V 7/04

[52] U.S. Cl. ..................................... 359/49; 359/83; 362/31

[58] Field of Search ............... 359/48, 49, 83; 362/31, 362/222, 296, 341

[56] References Cited

U.S. PATENT DOCUMENTS

| | | | |
|---|---|---|---|
| 4,042,294 | 8/1977 | Billings, Jr. et al. | 359/49 |
| 4,118,111 | 10/1978 | Laesser | 359/49 |
| 4,929,062 | 5/1990 | Guzik et al. | 362/297 |
| 4,958,911 | 9/1990 | Beiswenger et al. | 359/83 |
| 5,046,826 | 9/1991 | Iwamoto et al. | 359/49 |
| 5,050,946 | 9/1991 | Hathaway et al. | 359/48 |
| 5,064,276 | 11/1991 | Endo et al. | 359/49 |

*Primary Examiner*—Stanley D. Miller
*Assistant Examiner*—Anita Pellman Gross

*Attorney, Agent, or Firm*—Pravel, Gambrell, Hewitt, Kimball & Krieger

[57] ABSTRACT

A backlighted liquid crystal display (LCD) system with a light source and a light pipe which is separated from the LCD panel by an air gap to facilitate uniform brightness of the viewing area. The air gap effectively blocks conductive heat transfer from the light source to the LCD panel. The LCD panel is enframed within a metal frame that serves as a heat sink which prevents a temperature gradient across the LDC panel. The light source is fastened to the light pipe and remaining exposed areas of the light source are covered with an insulating material to trap heat and prevent heat radiation to the LCD panel. A sheet of heat conductive material, which lines the inner back surface of a plastic enclosure surrounding the LCD display assembly, serves to equally distribute heat throughout the inner area of the enclosure. The exposed surface of the heat conductive lining is preferably blackened. Optionally, the heat conductive shield may be included to capture heat radiating from the light source and convey this heat to the heat conductive lining. Insulating material is placed between the heat conductive shield and the metal frame of the LCD panel to prevent heat transfer to the LCD panel.

10 Claims, 2 Drawing Sheets

LCD SYSTEM WITH A BACKLIGHT HAVING A LIGHT SOURCE AT A LIGHT PIPE'S EDGE AND WITH THE LCD ENFRAMED

BACKGROUND OF THE INVENTION

1. Field of the Invention

The invention relates to a backlighted liquid crystal display system with uniform brightness of the viewing area.

2. Description of the Related Art

Liquid crystal displays (LCD's) are commonly used in portable computer systems, televisions and other electronic devices. An LCD requires a source of light for operation because the LCD is effectively a light valve, allowing transmission of light in one state and blocking transmission of light in a second state. Portable and laptop computers typically use an LCD panel that comprises a liquid crystal polymer encapsulated between at least two planar glass plates in parallel with each other. A polarization layer is bonded to the outer surface of each glass plate such that the glass plates are sandwiched between two polarization layers. An alternate type of LCD panel may include a thin polymer film, or retardation layer, located between each glass plate and its respective polarization layer.

The inner surface, or the surface facing the liquid crystal polymer, of each glass plate includes mutually perpendicularly oriented conductive transparent lines. The volume between any two orthogonal lines forms a cube whose face area constitutes a pixel. The lines are connected on the periphery of the glass plates via input-/output (IO) strips to accompanying electronic circuitry. The functions of the LCD panel elements introduced above will not be described as they are well known by those skilled in the art.

Backlighting the LCD panel has become the most popular source of light in portable computer systems because of the improved contrast ratios and brightnesses possible. A backlight including, a light source and a light pipe located next to and aligned parallel with the back surface of the LCD panel provides light to the LCD panel. The light pipe is capable of reflecting are distributing the light perpendicularly over its entire front surface, wherein the front surface was either optically bonded or placed adjacent to the back surface of the LCD panel. The light source is conventionally a florescent tube attached to at least one edge surface of the light pipe. A reflective material may be wrapped around the light source to redirect light from the light source into the light pipe.

The brightness of the LCD panel is related to the transmission characteristic of the liquid crystal polymer and the retardation layer polymer. The LCD panel is temperature sensitive in that the transmission characteristic of the liquid crystal polymer and retardation layer polymer changes significantly with variations in temperature. A uniform transmission characteristic over the LCD panel requires as uniform a temperature distribution as possible. The main drawback of the assembly described above is that the heat dissipated by the light source(s) is either radiated directly or conducted via the light pipe to the LCD panel. The undesirable result is a temperature gradient between the back and front surfaces as well as a temperature gradient between the edges and the center of the LCD panel. These temperature gradients cause the LCD display to have different brightnesses around its edges as compared to its center so that the viewing area does not have a uniform brightness.

SUMMARY OF THE PRESENT INVENTION

The object of the present invention is to provide uniformity of brightness of the LCD panel by reducing heat transfer from the light source to the LCD panel. The exposed portions of each light source are wrapped with reflective insulating material, such as white felt, to maintain the optimally efficient operating temperature of the backlight and to reduce thermal radiation to the LCD panel. The backlight is separated from the LCD panel by a relatively wide air gap which effectively blocks conductive heat transfer from each light source to the LCD panel. The LCD panel is also enframed with metal so that the resulting metal frame shields against electromagnetic interference (EMI), adds rigidity to the LCD panel, and serves as a heat sink which prevents a temperature gradient across the LCD panel.

The present invention also includes a sheet of heat conductive material which lines the inner back surface of a plastic enclosure surrounding the LCD display assembly. The heat conductive lining is preferably blackened to function as a black body which absorbs and equally distributes the heat generated by each light source throughout the inner area of the enclosure. The heat conductive lining also increases heat transfer through the enclosure wall to the surrounding ambient air.

Optionally, a heat conductive shield may be included to capture heat radiating from each light source and convey this heat to the heat conductive lining. The heat conductive shield is located between the light source(s) and the metal frame, and is fastened in good thermal contact with the heat conductive lining. A layer of insulating material is placed between the heat conductive shield and the metal frame of the LCD panel to prevent heat transfer to the LCD panel.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
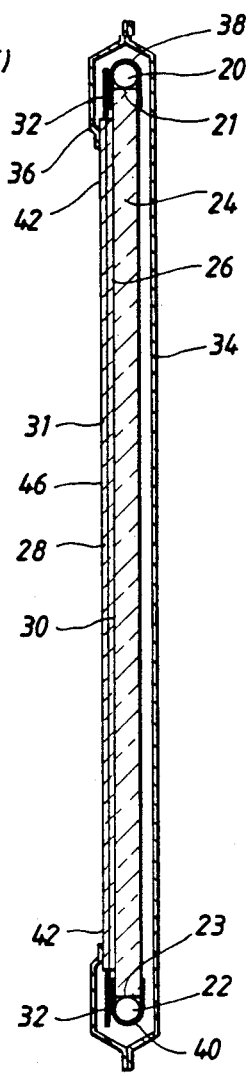
FIG. 1 is a cross-sectional side view of a liquid crystal display system of prior art.

FIG. 1 illustrates a backlighted LCD display system of the prior art. Two light sources 20 and 22, which are typically florescent tubes, are attached to the respective edge surfaces 21 and 23 of a light pipe 24. The light pipe 24 is capable of reflecting and distributing the light from the light sources 20 and 22 perpendicularly out of its entire front surface 26. The light sources 20 and 22 and the light pipe 24 together form a backlight. An LCD panel 28 typically includes a liquid crystal polymer (not shown) encapsulated between at least two planar glass plates (not shown) in parallel with each other. The glass plates of the LCD panel 28 may be sandwiched between two thin polymer film retardation layers (not shown) The LCD panel 28 includes a back surface 30 for receiving light from the light pipe 24, and a front surface 31 for viewing light allowed to pass through the LCD panel 28. The brightness of the front surface 31 of the LCD panel 28 is related to the transmission characteristic of the liquid crystal polymer and the polymer of the retardation layers. The LCD panel 28 is temperature sensitive in that the transmission characteristic of the liquid crystal polymer and retardation polymer changes significantly with variations in temperature. The complete function of the LCD panel 28 is not described as it is well known to those skilled in the art.

The front surface 26 of the light pipe 24 is either optically bonded or placed adjacent to the back surface 30 of the LCD panel 24. Electronic driving circuitry 32 is connected at the periphery of the LCD panel 28 to allow control of the LCD panel 28. All of the elements described above are encased in a metal enclosure comprising a metal back piece 34 fastened to a metal front piece 36. The metal front piece 36 covers only the peripheral edge areas of the LCD panel 28 so that the majority of the front surface can be viewed. Two pieces of reflective material 38 and 40 may be wrapped around the light sources 20 and 22, respectively, and adhesively bonded to the light pipe 24. The pieces of reflective material 38 and 40 redirect light from the light sources 20 and 22 into the light pipe.

Much of the heat dissipated by the light sources 20 and 22 is either radiated to the LCD panel 28 or conducted through the edge surfaces 21 and 23 to end areas 42 of the LCD panel 28. The dissipated heat creates a temperature gradient between the end areas 42 of the LCD panel 28 and a center area 46 of the LCD panel 28. The heat may also create a temperature gradient between the back surface 30 and the front surface 31 at the end areas 42 of the LCD panel 28. These temperature gradients create a nonuniform transmission characteristic of the liquid crystal polymer and retardation polymer which creates nonuniform brightness of the front surface 31 of the LCD display 28. The brightness of the LCD display 28 is, therefore, different at the end areas 42 as compared to the center area 46.

Figure 2:
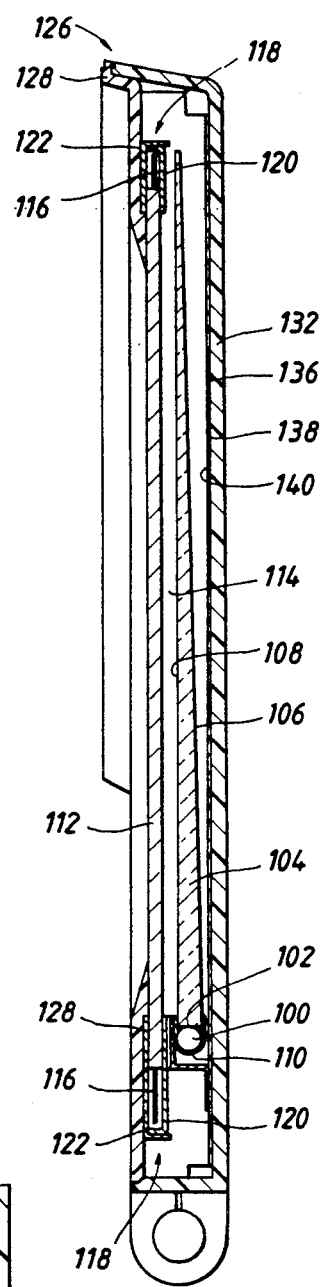
FIG. 2 is a cross-sectional side view of a liquid crystal display system according to the present invention.

FIG. 2 is a cross-sectional side view illustrating the LCD display system of the present invention. A single light source 100, preferably a florescent light tube, is attached to one edge surface 102 of a light pipe 104. The light pipe 104 functions similarly as the light pipe 24 in that light from the light source 100 is directed by a back surface 106 which is capable of reflecting and distributing the light from the light source 100 perpendicularly over an entire opposite, or front surface 108 of the light pipe 104. Together the light source 100 and the light pipe 104 form a backlight. This particular backlight structure is more completely described in U.S. patent application Ser. No. 589,325, filed Sep. 27, 1990, entitled "Faceted Light Pipe" by Hathaway et al., which is assigned to a common assignee and which is hereby incorporated by reference. A layer of light reflective, heat insulating material 110 is included which wraps around the exposed portions of the light source 100 and is adhesively bonded to the backlight 104. The layer of reflective insulating material 110 is preferably made from a piece of reflective and heat insulating material, such as white felt or the like. The layer of reflective insulating material 110 preferably redirects light from the light source 100 into the light pipe and also traps heat in order to maintain the temperature of the light pipe 104 to its optimally efficient operating temperature. The heat insulating function of the reflective insulating material 110 is taught and more fully described in Hathaway et al. The light source 100 and light pipe 104 are separated from an LCD panel 112 by an air gap 114. The air gap 114 effectively prevents substantial conductive heat transfer from the light source 100 to the LCD panel 112.

Electronic circuitry 116 is attached to the periphery of the LCD panel 112. The LCD panel 112 and the electronic circuitry 116 are "enframed" in a metal frame 118 comprised of a back frame member 120 attached to a front frame member 122, which will be described in more detail below. The inner border of the metal frame 118 thus forms the viewing, visible or exposed area of the LCD panel 112. The metal frame 118 shields against electromagnetic interference (EMI) which emanates from additional LCD driving circuitry 124 (FIG. 4) and the high voltage supply used with the light source 100, adds rigidity to the LCD panel 112, and serves as a heat sink that prevents temperature gradients across the LCD panel 112. Note that the metal enclosure of the prior art LCD display system comprising the metal back piece 34 fastened to the metal front piece 36 (FIG. 1) does not "enframe" the LCD panel 28 but instead encases the entire assembly. The metal frame 118 of the LCD display system of the present invention enframes the LCD panel 112 and the electronic circuitry 116, whereas the entire assembly described above is enclosed in a separate plastic enclosure 126. The plastic enclosure 126 preferably comprises a front panel 128 having plastic tabs 130 (FIG. 4), and a pan-shaped back member 132 having lip members 134 (FIG. 4), wherein the tabs 130 align and snap together with the lip members 134 such that the front panel 128 attaches to the back member 132 to form the enclosure 126 which encompasses the entire LCD display system.

A heat conductive lining 136 is bonded in good thermal contact to the inner back surface 138 of the back member 132 of the enclosure 126. The heat conductive lining 136 is preferably made from a sheet of high thermally conductive material, such as aluminum, copper, or the like. The exposed surface 140 of the heat conductive lining 136 is preferably black anodized or otherwise blackened. The heat conductive lininq 136 absorbs and equally distributes the heat generated from the light source 100 throughout the inner area enclosed by the enclosure 126. The heat conductive lining 136 also increases heat transfer through the walls of the enclosure 126 to the surrounding ambient air.

Figure 3:
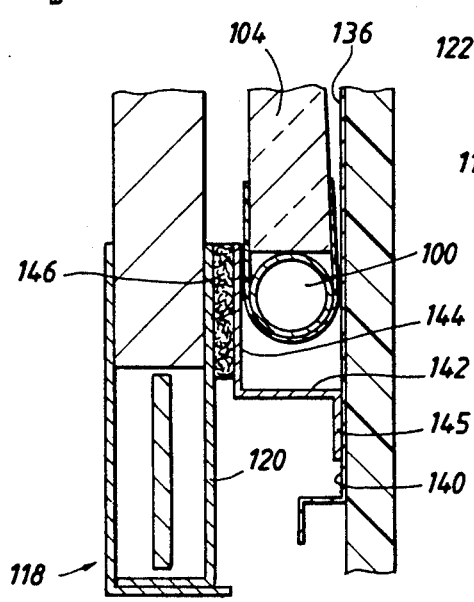
FIG. 3 is a partial cross-sectional side view of the liquid crystal display system of FIG. 2 showing further details of the invention.

FIG. 3 is a partial cross-sectional side view of the liquid crystal display system of FIG. 2. A heat conductive shield 142 is optionally included which is preferably made of a high thermally conductive material, such as aluminum, copper, or the like. The heat conductive shield 142 includes a heat-fin member 144 which is located between the light source 100 and the back frame member 120, and a fastening member 145. When present, the fastening member 145 of the heat conductive shield 142 is preferably fastened in good thermal contact to the exposed surface 140 of the heat conductive lining 136. The fastening means could be one of several methods known in the art, but is preferably done with 2-sided tape (not shown). In this manner when the heat conductive shield 142 is provided, any heat that radiates or conducts from the light source 100 away from the light pipe 104 or the heat conductive lining 136 is captured by the heat conductive shield 142 and transferred to the heat conductive lining 136.

Additionally, a heat insulation layer 146 is sandwiched between the back frame member 120 of the metal frame 118, and the heat-fin member 144 of the heat conductive shield 142. The heat insulation layer 146 is preferably made of a heat insulating material with low thermal conductivity, such as felt or the like. The heat insulation layer 146 prevents heat from radiating from the heat-fin member 144 to the back frame member 120.

Figure 4:
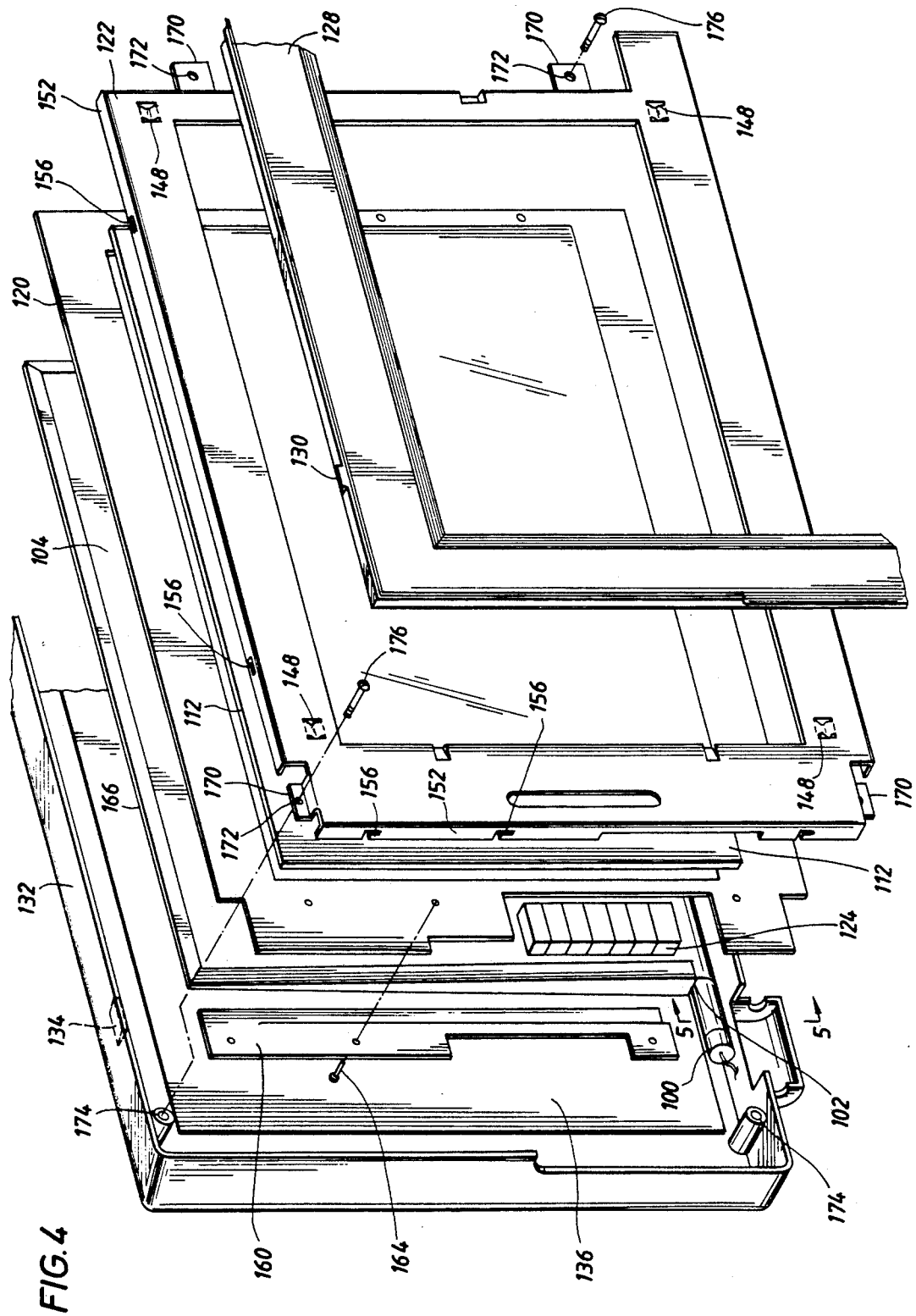
FIG. 4 is an exploded partial isometric view of the liquid crystal display system of FIG. 2.

FIG. 4 is an exploded partial isometric view of the LCD display system of the present invention. The LCD panel 112 is enframed between the back frame member 120 and the front frame member 122 of the metal frame 118. The front frame member includes punched tabs 148 which position and hold the LCD panel 112 in place in the metal frame 118. The front frame member includes lip extensions 152 which encompass the back frame member when the front and back frame members 122 and 120 are placed together. The lip extensions 152 include metal tabs 156 which are bent inward against the backside of the back frame member 120 to hold the back frame member 120 securely to the front frame member 122.

The light source 100 is shown attached to the lower edge surface 102 of the light pipe 104. Note that the light source 100 is longer than the light pipe 104 such that the light source 100 extends beyond the sides of the light pipe 104 as shown in FIG. 4. The top edge 166 of the light pipe 104 abuts against several metal tabs (not shown) punched out of the back frame member 120, and the light pipe 104 is set flush with the backside of the back frame member 120. The back frame member 120 holds the light pipe away from the LCD panel 112 to allow for the resulting air gap 114 of at least the thickness of the back frame member 120, and more if the back frame member 120 includes appropriate raised and lowered portions, particularly a recessed or lowered portion providing clearance between the light source 100 and the back frame member 120 to limit heat transfer directly from the light source 100 to the back frame member 120. The light pipe 104 is then securely fastened to the back frame member 120 using at two brackets 160 and 162, and preferably two screws 164 for each of the brackets 160. Only one of the brackets 160 and screws 164 are shown for clarity. The light pipe 104 extends beyond the inner boarder of the metal frame 118, so that the entire viewing area of the LCD panel 112 is illuminated and to provide the air gap 114. The front frame member includes four metal tabs 170, each including a hole 172, which aligns with four screw sockets 174. Only two of the screw sockets 174 are shown for clarity. Four screws 176, only two shown for clarity, are then inserted into the holes 172 and screwed into the screw sockets 174 to securely fasten the metal frame 118 and the light pipe 104 to the back member 132 of the plastic enclosure 126. The heat conductive lining 136 is, as described previously, bonded to the plastic pan-shaped back member 132. The front panel 128 and the back member 132 are then snapped together, using the lip members 134 and the tabs 130 as previously described, thus sandwiching all of the elements of the LCD display system together.

Figure 5:
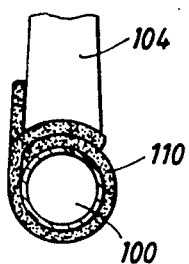
FIG. 5 is a partial cross-sectional side view of the backlight looking along lines 5—5 of FIG. 4.

FIG. 5 is a partial cross-sectional side view of the backlight looking along lines 5—5 of FIG. 4. The layer of reflective insulating material 110 is wrapped around the light source 100 and runs partially up the backside of the light pipe 104, along the length of the light pipe 104. Since the light source 100 extends beyond the sides of the light pipe 104 (FIG. 4), the layer of reflective insulating material 110 wraps around the exposed portions of the light source 100, as clearly shown in FIGS. 4 and 5.

The foregoing disclosure and description of the invention are illustrative and explanatory thereof, and various changes in the size, shape, materials, components, elements, connections and contacts, as well as in the details of the illustrated system and construction may be made without departing from the spirit of the invention.

I claim:

1. A backlighted liquid crystal display system, comprising:
   a liquid crystal display panel having a back surface for receiving light;
   a metal frame having an inner border, wherein said metal frame enframes said liquid crystal display panel, said inner border defining the exposed area of said back surface of said liquid crystal display panel;
   a light pipe having a planar front surface for providing light to said liquid crystal display panel back surface, having at least one end surface for receiving light to be transmitted through said front surface, and having a back surface, said front surface being aligned generally parallel with and separated from said liquid crystal display panel back surface, and wherein said light pipe planar front surface extends in a plane beyond said metal frame inner border; and
   light source means for providing light to said light pipe, a light source located adjacent each said end surface for receiving light of said light pipe.

2. The system of claim 1, wherein each of said light source means is partially encompassed by insulation.

3. The system of claim 1, further comprising:
   an enclosure having an inner cavity with a resulting inner surface for generally receiving said light source, light pipe, metal frame and liquid crystal display panel, wherein a portion of said inner surface generally faces towards said light pipe back surface and said light source means;
   a sheet of heat conductive material with a first side and a second side; and
   means to bond said first side of said heat conductive sheet to said inner cavity inner surface portion so as to be in good thermal contact with said enclosure.

4. The system of claim 3, wherein said second side of said heat conductive sheet is blackened.

5. The system of claim 3, wherein said heat conductive sheet is formed of copper.

6. The system of claim 3, wherein said heat conductive sheet is formed of aluminum.

7. The system of claim 3, further comprising:
   at least one heat conductive shield, each heat conductive shield including a member for fastening to said heat conductive sheet and a heat-fin member integrally formed with said fastening member, said heat-fin member being placed between said metal frame and said light source means; and
   means to fasten said heat conductive shield fastening member to said heat conductive sheet for providing good thermal contact between said heat conductive sheet and said heat conductive shield.

8. The system of claim 7, wherein said heat conductive shield is formed of aluminum.

9. The system of claim 7, wherein said heat conductive shield is formed or copper.

10. The system of claim 7, further comprising a layer of heat insulation material between said heat conductive shield and said metal frame.

* * * * *

UNITED STATES PATENT AND TRADEMARK OFFICE
CERTIFICATE OF CORRECTION

PATENT NO. : 5,146,354
DATED : September 8, 1992
INVENTOR(S) : Boris Plesinger

It is certified that error appears in the above-identified patent and that said Letters Patent is hereby corrected as shown below:

Column 6,
Line 55, delete "conductive-sheet" and insert -- conductive sheet --.

Column 8,
Line 2, after "formed" delete "or" and insert -- of --.

Signed and Sealed this

Seventh Day of March, 2006

JON W. DUDAS
*Director of the United States Patent and Trademark Office*